No. 714,488. Patented Nov. 25, 1902.
F. A. JOHNSON & W. I. BORELL.
CULINARY VESSEL.
(Application filed June 5, 1902.)
(No Model.)
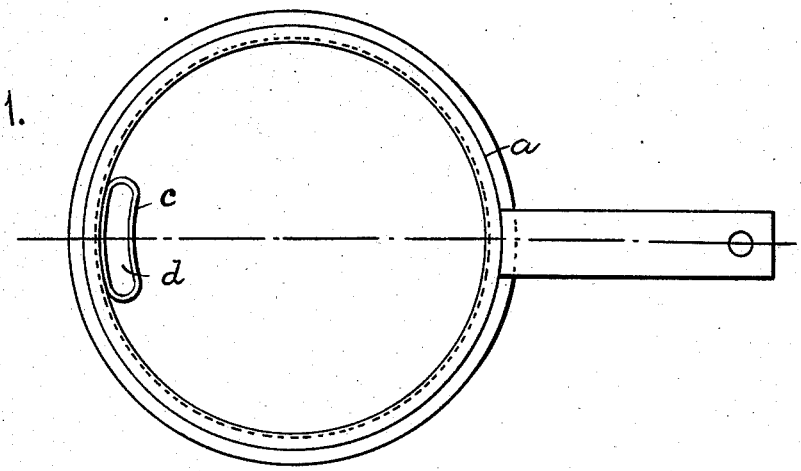
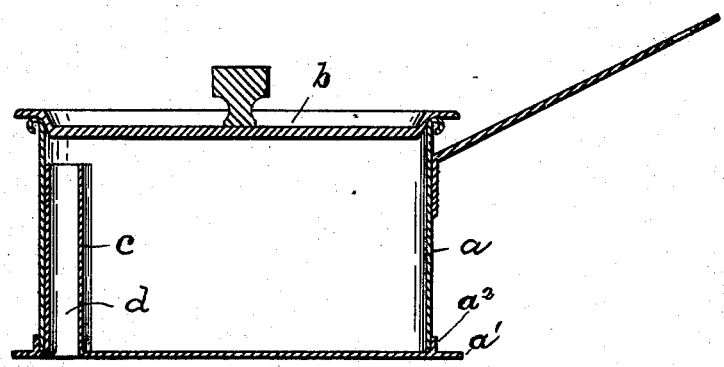

UNITED STATES PATENT OFFICE.

FRANK A. JOHNSON AND WILLIAM I. BORELL, OF READING, PENNSYLVANIA; SAID BORELL ASSIGNOR TO SAID JOHNSON.

CULINARY VESSEL.

SPECIFICATION forming part of Letters Patent No. 714,488, dated November 25, 1902.

Application filed June 5, 1902. Serial No. 110,315. (No model.)

*To all whom it may concern:*

Be it known that we, FRANK A. JOHNSON and WILLIAM I. BORELL, citizens of the United States, residing at Reading, in the county of Berks and State of Pennsylvania, have invented certain new and useful Improvements in Culinary Vessels; and we do hereby declare the following to be a full, clear, and exact description of the invention, such as will enable others skilled in the art to which it appertains to make and use the same.

This invention relates to improvements in culinary vessels and is intended more particularly for use on vessels in which the cooking of foodstuffs producing obnoxious odors is carried on.

The object of the invention is to produce a vessel in which the steam and odor arising from the boiling contents thereof will be conveyed from the vessel through the stove and out through the draft-stack or chimney without permitting its escape into the room.

To this end our invention consists in the details of construction as fully set forth in the following specification and clearly illustrated in the accompanying drawings, in which—

Figure 1 is a plan view of our vessel. Fig. 2 is a vertical sectional view of the same.

The vessel has a circular body portion $a$, is provided with a cover $b$, and has an outwardly-projecting flange $a'$ around its bottom.

The vessel is composed of a base $a'$, which is provided with an upwardly-extending flange $a^2$, located at a point somewhat remote from its edge, and the body portion $a$ is secured to said base, so that its lower edge stands within this flange. The base is also provided near one edge and in close proximity to the body portion with an elongated aperture $d$, and around this aperture is secured a tube $c$, which is made integral with the base. Said tube $c$ conforms in shape with the contour of the body portion and extends upward within the body and terminates short of the top thereof. One wall of this tube contacts for its entire length with the inner face of the body. A suitable cover $b$ is placed on the vessel when cooking, and any desirable means may be employed to raise or carry the vessel; but we have preferably shown an ordinary handle secured to the outside of the body portion diametrically opposite the tube $c$.

When the vessel is placed over an opening in the stove-top and the contents thereof attain a boiling-point, the steam, as well as the odor arising therefrom, will pass out through the tube $c$ and the opening $d$ into the fire-chamber of the stove and will be carried therefrom, together with the gases, through the usual outlet or chimney.

The annoyance of steam, and particularly the obnoxious odors arising from cooking of foods of different kinds, is entirely overcome by the use of our improved device.

Having thus fully described our present invention, what we claim, and desire to secure by Letters Patent, is—

A device of the class described, consisting of a base provided with an upwardly-extending flange, remote from its edge, a body portion, the lower edge of which is secured to the base, within the flange, said base being provided at one point with an elongated aperture located in close proximity to the body portion, a tube surrounding the aperture and integral with the base, said tube conforming in shape with the contour of the body, and with one wall contacting with the inner face of the body, for its entire length, the whole terminating short of the top of the body, a handle secured to the body, and a cover adapted to close the vessel.

In testimony whereof we affix our signatures in presence of two witnesses.

FRANK A. JOHNSON.
WILLIAM I. BORELL.

Witnesses:
ED. A. KELLY,
JOS. R. DICKINSON.